United States Patent [19]

Eguchi

[11] Patent Number: 4,614,259
[45] Date of Patent: Sep. 30, 1986

[54] CLUTCH DRUM FOR AUTOMATIC TRANSMISSION

[75] Inventor: Shinsuke Eguchi, Zama, Japan

[73] Assignee: Nissan Motor Company, Limited, Yokohama, Japan

[21] Appl. No.: 524,717

[22] Filed: Aug. 19, 1983

[30] Foreign Application Priority Data

Aug. 20, 1982 [JP] Japan .............................. 57-144557

[51] Int. Cl.$^4$ ............................................. F16D 11/04
[52] U.S. Cl. ............................. 192/70.11; 192/85 AA
[58] Field of Search ............. 192/70.11, 85 R, 85 AA

[56] References Cited

U.S. PATENT DOCUMENTS

| | | | |
|---|---|---|---|
| 3,225,627 | 12/1965 | Christenson | 192/85 AA |
| 3,379,293 | 4/1968 | Hill | 192/85 AA |
| 3,765,519 | 10/1973 | Kell | 192/85 AA |
| 4,040,339 | 8/1977 | Ivey | 192/85 AA |
| 4,186,829 | 2/1980 | Schneider et al. | 192/85 AA |
| 4,237,749 | 12/1980 | Kolvunen | 192/70.11 |
| 4,442,929 | 4/1984 | Uchida | 192/85 AA |

Primary Examiner—Ronald C. Capossela
Attorney, Agent, or Firm—Schwartz, Jeffery, Schwaab, Mack, Blumenthal & Evans

[57] ABSTRACT

A clutch drum comprises an outer tubular portion engaged with a plurality of clutch plates, an inner tubular portion rotatably disposed around a stationary sleeve shaft fixed to a transmission case, and a disc portion radially extending between the outer and inner tubular portions. The clutch drum further includes a mounting portion connected to the inner tubular portion and extends inwardly of the inner tubular portion. The mounting portion is splined to an input shaft of the transmission.

8 Claims, 3 Drawing Figures

CLUTCH DRUM FOR AUTOMATIC TRANSMISSION

BACKGROUND OF THE INVENTION

The present invention relates to a clutch for an automatic transmission and more particularly to a clutch drum for a clutch for an automatic transmission.

A known clutch drum of the above kind is shown in FIG. 1 which is disclosed in U.S. Pat. No. 4,267,910 issued to Yamamori et al. (see FIG. 1(A), a clutch drum 70). Referring to FIG. 1, an automatic transmission comprises a forward clutch 40 whose clutch drum 41 is splined to an input shaft 21 that is driven by a torque converter, not shown. The clutch drum 41 includes an outer tubular portion 41a engaged with a plurality of drive plates 42 for unitary rotation, an inner tubular portion 41d rotatably mounted to a stationary sleeve which is fixed to a transmission case, not shown, a disc portion 41e connected to both of the tubular portions 41a, 41d and defining a space between both of the tubular portions 41a, 41d for slidably receiving a piston 45, and a mounting portion 41f splined to the input shaft 21. Interleaved with the drive plates 42 are a plurality of driven plates 43 which are engaged in unitary rotation with an internal gear 53 of a planetary gear set. Extending through the input shaft 21 is an oil pump drive shaft 22 for driving an oil pump, not shown, which supplies fluid under pressure to fluid chamber 35 defined between the piston 45 and the disc portion 41e via fluid passage 41g and a circumferential groove 41k. Seals 41b are arranged to prevent fluid leakage via clearnace between the stationary sleeve 41c and the inner tubular portion 41d. When fluid pressure is supplied to the fluid chamber 35, the piston 45 is displaced to the right, viewing in FIG. 1, to press the driven plates 42 into engagement with the driven plates 43. This causes the internal gear 53 to rotate with the clutch drum 41. The clutch piston 45 is biased by a return spring 46 so that the clutch piston 46 assumes the illustrated position when the pressure in fluid within the fluid chamber 35 drops. Thrust washers, which serve as thrust bearings, are denoted by the reference numerals 41h, 41i and 41j.

The above mentioned clutch drum 41 features the mounting portion 41f which extends outwardly and axially from the inner tubular portion 41d. In other words, the mounting portion 41f is axially displaced from the inner tubular portion 41d. With this structure, a misalignment of the mounting portion 41f relative to the inner tubular portion 41d is amplified at the inner tubular portion 41d, resuting in a substantial amount of a radial displacement of the inner tubular portion 41d relative to the stationary sleeve 41c. Thus, when the fluid pressure in the fluid pressure chamber 35 is increased to displace the piston 45 relative to the clutch drum 41, a lefthand end, as viewed in FIG. 1, of the inner tubular portion 41d is pressed against the stationary sleeve 41c due to the reaction force applied to the clutch drum 41. This poses the following problems, i.e., the inner tubular portion 41d and the stationary sleeve 41c wear at their contacting surfaces, the seals 41b wear at a fast rate and thus are degraded quickly because the force with which the inner tubular portion 41d contacts with the seals 41b increases.

SUMMARY OF THE INVENTION

According to the present invention, there is provided a clutch drum in a clutch for an automatic transmission having a stationary element and a torque transmitting shaft, the clutch including a plurality of first clutch plates, a plurality of second clucth plates interleaved with the first clutch plates, and a fluid operated piston to press the first and second clutch plates into engagement with each other. The clutch drum comprises an outer tubular portion engaged with the plurality of first clutch plates, an inner tubular portion rotatably disposed around the stationary element, and a disc portion connected to the outer and inner tubular portions and radially extending therebetween to define a space slidably receiving therein the fluid operated piston. The clutch drum further comprises a mounting portion connected to the inner tubular portion and extending inwardly of the inner tubular portion, said mounting portion being mounted to the torque transmitting shaft for rotation therewith so that said clutch drum is rotatable with the torque transmitting shaft.

Accordingly, an object of the present invention is to provide a clutch drum with which substantial wear of mutually facing surfaces of the inner tubular portion and the stationary element is avoided and the life of seals mounted on the stationary element is extended.

DETAILED DESCRIPTION OF THE INVENTION

Figure 3:
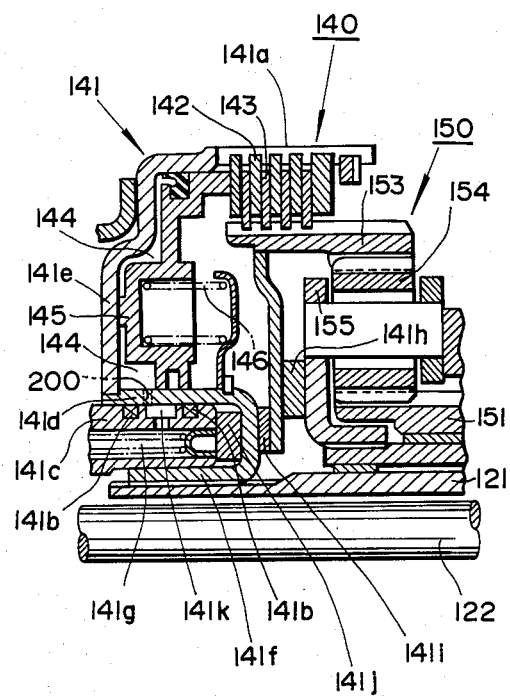
FIG. 3 is an enlarged fragmentary view of FIG. 2.
Figure 2:
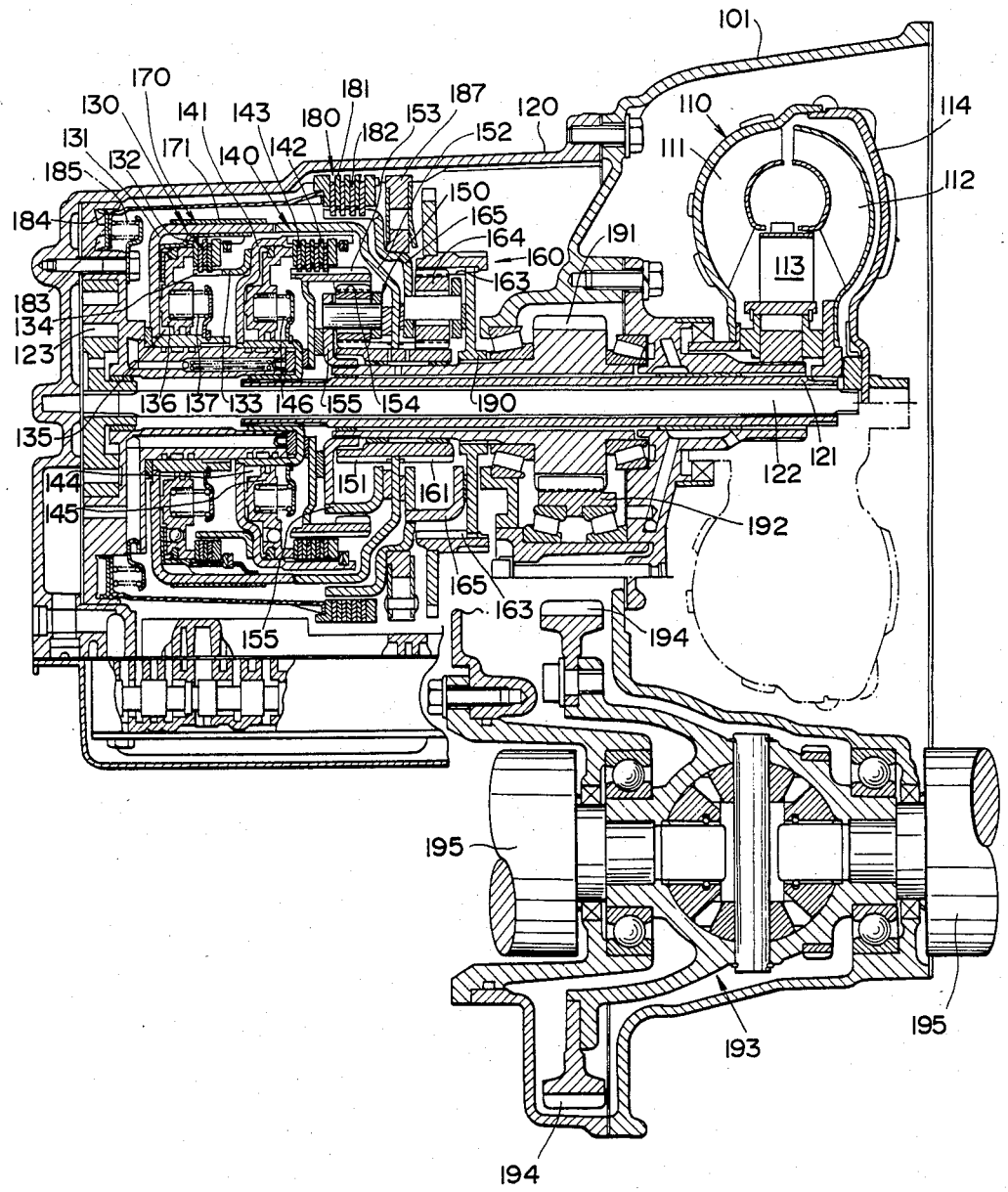
FIG. 2 is a longitudinal sectional view of an automatic transmission including a preferred embodiment of a clutch drum according to the present invention.

Referring to the accompanying drawings, and more particularly to FIGS. 2 and 3, the preferred embodiment of the present invention is described.

Referring to FIG. 2, the automatic transmission comprises, within a converter housing 101, a torque converter 110 which includes a pump impeller 111, a turbine runner 112 and a stator 113.

Secured by bolts to the converter housing 101 is a transmission case 120. Within the transmission case 120, a high and reverse clutch 130, a forward clutch 140, a first planetary gear set 150, a second planetary gear set 160, a band servo 170, and a low and reverse brake 180 are arranged as associated with torque transmitting elements. The torque transmitting elements include an input shaft 121 having one end splined to a hub portion of the turbine runner 112 to rotate a clutch hub 133 of the high and reverse clucth 130 and a clutch drum 140 of the forward clucth 140 which are arranged near the opposite end of the input shaft 121.

The high and reverse clutch 130 comprises a clutch drum 131 which is connected via a connecting shell 152 to a sun gear 151 of the first planetary gear set 150, a plurality of driven plates 132 splined to the clutch 131, a plurality of drive plates 134 splined to a clutch hub 133, a piston 136 which is adapted to be actuated by fluid pressure admitted to a fluid chamber 135 to press the plates 132, 134 into engagement with each other, and a return spring 137. When engaged, the high and reverse clutch 130 establishes a mechanical connection between the clutch hub 133 and the sun gear 151 of the first planetary gear set 150, while, when disengaged, it interrupts the mechanical connection.

The clutch drum 131 is surrounded by a brake pad 171 of a band servo 170 which is actuated by a servo cylinder, not shown.

The forward clutch 140 comprises a clutch drum 141, a plurality of drive plates 142 splined to the clutch drum 141, a plurality of driven plates 143 splined to an internal gear 153 of the first planetary gear set 150, a piston 145 which is adapted to be actuated by fluid pressure admitted to a fluid chamber 144 to press the plates 142, 143 into engagement with each other, and a return spring 146. When engaged, the forward clutch 140 establishes a mechanical connection between the clutch drum 141 and the internal gear 153 of the first planetary gear set 150 and when disengaged, it intrrupts the mechanical connection.

As best seen in FIG. 3, the clutch drum 141 includes an outer tubular portion 141a, an inner tubular portion 141d, a disc portion 141e, and a mounting portion 141f. The outer tubular portion 141a is splined to the outer periperies of the drive plates 142. The inner tubular portion 141d is rotatably mounted to a stationary sleeve 141c fixed to the transmission case 120. The disc portion 141e is connected to the outer and inner tubular portions 141a, 141d at their axial ends and extends radially therebetween. The disc portion 141e cooperates with the outer and inner tubular portions 141a, 141d to define a space which slidably receives the piston 145. The piston 145 defines the fluid chamber 144 between the piston 145 and the disc portion 141e. The mounting portion 141f extends from the free axial end of the inner tubular portion 141d in a manner to surround the free end portion of the stationary sleeve 141c. Therefore, in a radial cross section of the clutch drum 141, the outer tubular portion 141a, the inner tubular portion 141d and the mounting portion 141f form a triplex structure, and they define a generally S-shape when viewed in axial section thereof as shown in FIG. 3. Formed through the stationary sleeve 141c are a fluid passage 141g and a circumferential groove 141k which communicates with a fluid chamber 144 via an aperture 200 formed through the inner tubular portion 141d. The fluid chamber 144 therefore communicates with an oil pump 123 via a control valve, not shown. The reference numerals 141h, 141j, 141j denote washers which serve as a thrust bearing.

The low and reverse brake 180 comprises a plurality of driven plates 181 splined to the transmission case 120, a plurality of drive plates 182 splined to a planet carrier 165 of the second planetary gear set 160, a piston 184 which is adapted to be actuated by fluid pressure admitted to a fluid chamber 183 to press the plates 181, 182 into engagement with each other, and a return spring 185. When applied, the low and reverse brake 180 anchors the planet carrier 165 of the second planetary gear set 160. In parallel with this low and reverse brake 180, a one-way clutch 187 is arranged to prevent reverse rotation of the planet carrier 165.

The first planetary gear set 150 comprises the before mentioned sun gear 151, an internal gear 153 and a planet carrier 155 which carries a plurality of planet pinions 154 meshing with both of the gears 151 and 153. The planet carrier 155 is splined to an output shaft 190.

The secondary planetary gear set 160 comprises the before mentioned planet carrier 165, a sun gear 161 integral with the sun gear of the first planetary gear set 150, an internal gear 163 splined to the output shaft 190, and a plurality of planet pinions 164 which mesh with both of the gears 161, 163. The planet pinions 164 are carried by the planet carrier 165.

The output shaft 190 is formed with an output gear 191 which meshes with an idler gear 192 which in turn meshes with a ring gear 194 of a final gearing 193 to rotate gears within the final gearing 193. Thus, a pair of drive shafts 195 are driven by the output shaft 141 via the final gearing 193.

Extending through the bore of the input shaft 121 is an oil pump drive shaft 122 which has one end splined to a hub portion of the converter cover 114 rotatable with the pump impeller 111 to drive the oil pump 123 arranged near the opposite end of the oil pump drive shaft 122.

The operation is described.

When a manual selector, not shown, is set in "D" (drive) position, fluid pressure is supplied to fluid chamber 144, thus engaging the forward clutch 140. Under this circumstance, a first speed ratio is established as long as the vehicle speed is low. In the first speed ratio, a drive power derived from an engine, not shown, is delivered through the torque converter 110 and input shaft 121 to the forward clutch 140. The forward clutch 140 rotates the internal gear 153 of the first planetary gear set which in turn rotates the sun gear 151, thus rotating the planet pinions 164 of the second planetary gear set. Since, the planet carrier 165 serves as a reaction member due to the action of the one-way clutch 187, the drive power is transmitted to the output shaft 190 via the internal gear 163, thus rotating the output shaft 190 with a large reduction ratio. Thereafter, the drive power is transmitted to road wheels, not shown, via the output gear 191, idler gear, final gearing 193 and drive shafts 195.

When, subsequently, the vehicle speed increases high enough to put the transmission in a second speed ratio, fluid pressure is supplied also to the servo cylinder, not shown, thus actuating the brake band 171 to apply the band servo 170. As a result, the front clutch drum 131 is anchored to prevent rotation of the sun gear 151. Under this circumstance, the drive power from the engine is delivered to the forward clutch drum 141 via the torque converter 110, input shaft 121 and forward clutch 140. The forward clutch 140 rotates the internal gear 153 of the first planetary gear set 153. Since the sun gear 152 is anchored to serve as a reaction member, the rotation of the internal gear 153 causes the rotation of the planet carrier 155 of the second planetary gear set and in turn the output shaft 190. Thereafter, the drive power is transmitted to the road wheels via the output gear 191, idle gear 192, final gearing 193 and drive shafts 195.

When the vehicle speed increases further to put the transmission in a third speed ratio, fluid pressure is supplied to a release side chamber, not shown, of the band servo 170 to release the brake band 171 and fluid pressure is also supplied to fluid pressure 135 to engage the high and reverse clutch 130. The drive power from the engine is delivered to the forward clutch 140 via the torque converter 110 and input shaft 121. A portion of the drive power delivered to the forward clutch 140 is transmitted to the internal gear 153 of the first planetary gear set, and the remaining portion is transmitted to the sun gear 151 via the high and reverse clutch 130 and connecting shell 152. As a result, the first planetary gear set is locked to rotate as a unit and thus the planet carrier 155 and the output shaft 190 rotate at the same speed. Thus, the direct drive is established.

When the manual selector is set in "R" (reverse) position, fluid pressure is supplied to fluid chambers 135, 183, thus engaging both the high and reverse clutch 130 and low and reverse brake 180. Under this circumstance, the drive power from the engine is delivered via the torque converter 110, input shaft 121 to the high and reverse clutch 130. The high and reverse clutch 130 rotates the sun gear 151 via the connecting shell 152. Since the planet carrier 165 of the second planetary gear set is anchored as a result of application of the low and reverse brake 180, the rotation of the sun gear 161 causes the internal gear 163 of the second planetary gear set to rotate in the reverse direction with a reduction ratio, thus rotating the output shaft 190 in the reverse direction. The reverse rotation of the output shaft 190 is transmitted to the road wheels via the output gear 191, idler gear 192 and final gearing 193 to the drive shafts 195.

As described above, the clutch drum 141 of the forward clutch 140 features its mounting portion 141*f* splined to the input shaft 121. The mounting portion 141*f* extends inwardly of the inner tubular portion 141*d* in a manner to surround the free end of the stationary sleeve 141*c* as best seen in FIG. 3. The outer tubular portion 141*a*, inner tubular portion 141*d* and mounting portion 141*f* define the triplex structure as viewed in the radial section wherein the mounting portion 141*f* and inner tubular portion 141*d* are axially disposed in the same position. This structure of the clutch drum 141 suppresses amplification of the radial displacement at the inner tubular portion 141*d* resulting from the misalignment of the mounting portion 141*f*. Since the radial displacement of the inner tubular portion 141*d* is very small, substantial wear of mutually engaging surfaces of the inner tubular portion 141*d* and stationary sleeve 141*c* is avoided. Rapid wear and quick degradation of the seals 141*b* are also prevented.

Figure 1:
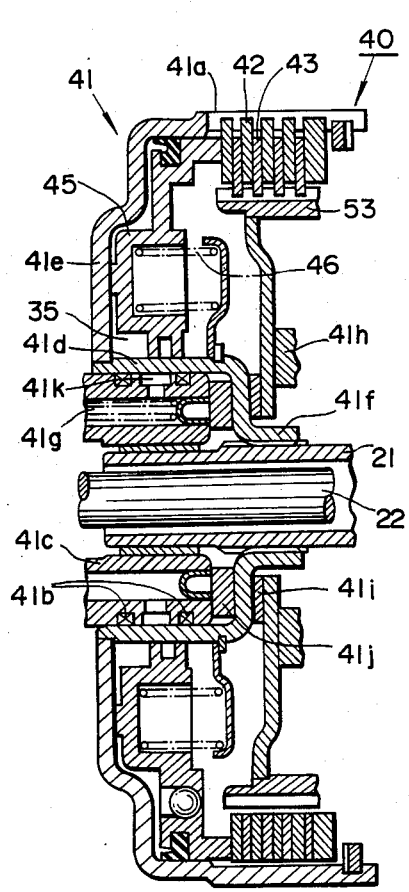
FIG. 1 is a fragmentary longitudinal sectional view of an automatic transmission illustrating the known clutch drum discussed.

Since the mounting portion 141*f* is disposed inside the inner tubular portion 141*d*, the clutch drum 141 has a short axial length as compared to the clutch drum 41 shown in FIG. 1. Thus, it will be appreciated the axial length of the clutch drum has been shortened according to the teaching of the present invention. The fact that the clutch drum has been shortened in its axial length will contribute to reducing the axial length of the automatic transmission. The teaching of the present invention if embodied in a transaxle reveals substantial merits.

I claim:

1. An automatic transmission comprising:
   a stationary element;
   a torque shaft having a splined portion;
   a clutch including a plurality of first clutch plates, a plurality of second clutch plates interleaved with said plurality of first clutch plates, a fluid operated piston, and a clutch drum, said clutch drum comprising:
   an outer tubular portion engaged with said plurality of first clutch plates;
   an inner tubular portion;
   a disc portion connected to said outer and inner tubular portions and radially extending therebetween to define a first space slidably receiving therein said fluid operated piston; and
   a mounting portion connected to said inner tubular portion and extending inwardly toward said inner tubular portion, said mounting portion defining a splined opening for receiving said torque transmitting shaft therein, said mounting portion being splined to said splined portion of said torque transmitting shaft for rotation therewith said mounting portion co-operating with said inner tubular portion to define a second space therebetween for receiving said stationary element.

2. An automatic transmission as claimed in claim 1, wherein the stationary element has mounted thereon seal elements which contact with said inner tubular portion.

3. An automatic transmission as claimed in claim 2, wherein said outer tubular portion, said disc portion and said mounting portion cooperate with each other to form a generally S-shape when viewed in an axial cross section of said clutch drum.

4. An automatic transmission as claimed in claim 3, wherein the stationary element includes a stationary sleeve fixed to a transmission case of the automatic transmission.

5. An automatic transmission as claimed in claim 4, wherein the torque transmitting shaft extends through the stationary sleeve.

6. An automatic transmission as claimed in claim 5, wherein the stationary sleeve is formed with a fluid passage communiating with said fluid chamber.

7. An automatic transmission as claimed in claim 6, wherein said mounting portion is disposed between the stationary sleeve and said torque transmitting shaft.

8. In an automatic transmission:
   a stationary element;
   a torque transmitting shaft;
   a clutch including a plurality of first clutch plates, a plurality of second clutch plates interleaved with said plurality of first clutch plates, a fluid operated piston, and a clutch drum,
   said clutch drum comprising an outer tubular portion engaged with said plurality of first clutch plates, an inner tubular portion, a disc portion connected to said outer and inner tubular portions and radially extending therebetween to define a first space slidably receiving therein said fluid operated piston, and a mounting portion connected to said inner tubular portion and extending inwardly toward said inner tubular portion, said mounting portion defining a mounting opening receiving said torque transmitting shaft therein and being mounted to said torque transmitting shaft for rotation therewith, said mounting portion cooperating with said inner tubular portion to define a second space therebetween which receives said stationary element;
   wherein said fluid operated piston is disposed in said first space so as to define a chamber;
   wherein said stationary element comprises a circumferential groove and an axial fluid passage communiating with said circumferential groove;
   wherein said inner tubular portion comprises an aperture opening into said chamber and said circumferential grove; and
   wherein seal elements are disposed between said stationary element and said inner tubular portion so as to interpose said circumferential groove.

* * * * *